US010637676B2

(12) United States Patent
Chen et al.

(10) Patent No.: US 10,637,676 B2
(45) Date of Patent: Apr. 28, 2020

(54) METHOD, APPARATUS, AND SYSTEM FOR MANAGING FOLLOWER ACCOUNTS IN GROUPS

(71) Applicant: TENCENT TECHNOLOGY (SHENZHEN) COMPANY LIMITED, Shenzhen (CN)

(72) Inventors: Hao Chen, Shenzhen (CN); Maowei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

(21) Appl. No.: 15/657,302

(22) Filed: Jul. 24, 2017

(65) Prior Publication Data
US 2017/0324570 A1 Nov. 9, 2017

Related U.S. Application Data

(63) Continuation of application No. PCT/CN2016/073277, filed on Feb. 3, 2016.

(30) Foreign Application Priority Data

Feb. 13, 2015 (CN) .......................... 2015 1 0080521

(51) Int. Cl.
H04L 12/18 (2006.01)
H04L 29/08 (2006.01)
(Continued)

(52) U.S. Cl.
CPC ........ *H04L 12/185* (2013.01); *H04L 41/0893* (2013.01); *H04L 51/14* (2013.01);
(Continued)

(58) Field of Classification Search
CPC ... H04L 12/185; H04L 51/14; H04L 67/1044; H04L 67/42; H04L 67/306; H04L 41/0893; H04L 29/06
See application file for complete search history.

(56) References Cited

U.S. PATENT DOCUMENTS 7,337,448 B1 * 2/2008 Dalia ................... G06Q 10/107
707/999.001
8,191,040 B2 * 5/2012 Hejlsberg .............. G06F 9/4488
717/114
(Continued)

FOREIGN PATENT DOCUMENTS

CN 102821085 A 12/2012
CN 102904798 A 1/2013
(Continued)

OTHER PUBLICATIONS

The World Intellectual Property Organization (WIPO) International Search Report for PCT/CN2016/073277 dated Mar. 24, 2016.
(Continued)

Primary Examiner — Jimmy H Tran
(74) Attorney, Agent, or Firm — Anova Law Group, PLLC

(57) ABSTRACT

Embodiments of the present disclosure relate to the field of computer and Internet technologies, and disclose a group management method, apparatus, and system. The method includes: obtaining an interface address corresponding to a group management operation; generating an interface call request carrying the interface address, the interface call request being used to call a group management interface provided by an open platform server, and the group management interface being used to perform a group management operation on a follower account following a target user account; and sending the interface call request to the open platform server. By means of group management, the fol-
(Continued)

lower account is properly and effectively managed, and moreover it is convenient for a user account operator to develop and implement services such as a group bulk messaging service.

15 Claims, 6 Drawing Sheets

(51) Int. Cl.
  *H04L 12/58* (2006.01)
  *H04L 12/24* (2006.01)
  *H04L 29/06* (2006.01)

(52) U.S. Cl.
  CPC ........ *H04L 67/1044* (2013.01); *H04L 67/306* (2013.01); *H04L 67/42* (2013.01); *H04L 29/06* (2013.01)

(56) References Cited

U.S. PATENT DOCUMENTS

| | | | | |
|---|---|---|---|---|
| 9,531,749 | B2* | 12/2016 | Kementsietsidis | G06F 16/24568 |
| 10,110,550 | B1* | 10/2018 | Dorsey | H04L 51/066 |
| 10,205,701 | B1* | 2/2019 | Voss | H04L 61/3025 |
| 2003/0051037 | A1* | 3/2003 | Sundaram | H04L 12/66 709/227 |
| 2003/0105844 | A1* | 6/2003 | Hada | H04L 41/0803 709/220 |
| 2003/0177185 | A1* | 9/2003 | Ryu | H04L 41/0213 709/204 |
| 2004/0225878 | A1 | 11/2004 | Costa-Requena et al. | |
| 2005/0240943 | A1* | 10/2005 | Smith | G06F 9/465 719/328 |
| 2007/0192277 | A1* | 8/2007 | Jackson | G06F 16/9535 |
| 2008/0045192 | A1* | 2/2008 | Zhao | H04L 63/104 455/414.2 |
| 2008/0109519 | A1* | 5/2008 | Aaltonen | H04L 51/38 709/206 |
| 2008/0270240 | A1* | 10/2008 | Chu | G06Q 10/06375 705/14.11 |
| 2008/0301294 | A1* | 12/2008 | Hellenthal | H04L 29/06 709/224 |
| 2009/0222884 | A1* | 9/2009 | Shaji | H04L 41/082 726/1 |
| 2011/0145733 | A1* | 6/2011 | Neitz | G06F 3/0486 715/761 |
| 2011/0231296 | A1* | 9/2011 | Gross | G06Q 10/10 705/37 |
| 2011/0307565 | A1* | 12/2011 | Szady | H04L 51/38 709/206 |
| 2012/0047214 | A1* | 2/2012 | Daly | G06F 9/546 709/206 |
| 2012/0227087 | A1* | 9/2012 | Brown | G06Q 50/01 726/3 |
| 2013/0014258 | A1* | 1/2013 | Williams | G06Q 30/0241 726/24 |
| 2014/0025736 | A1* | 1/2014 | Wang | H04L 45/46 709/204 |
| 2014/0096205 | A1* | 4/2014 | Zhuang | G06F 21/41 726/4 |
| 2014/0196060 | A1* | 7/2014 | Gheorghe | H04L 51/28 719/328 |
| 2015/0264038 | A1* | 9/2015 | Cao | H04L 63/08 726/6 |
| 2015/0295916 | A1* | 10/2015 | Sanso | H04L 63/0807 726/9 |
| 2015/0331901 | A1* | 11/2015 | Olsen | G06Q 10/101 707/738 |
| 2016/0162172 | A1* | 6/2016 | Rathod | G06F 3/0481 715/747 |
| 2016/0379213 | A1* | 12/2016 | Isaacson | G06Q 20/12 705/44 |

FOREIGN PATENT DOCUMENTS

| | | |
|---|---|---|
| CN | 103078827 A | 5/2013 |
| CN | 103166936 A | 6/2013 |
| CN | 103220259 A | 7/2013 |
| CN | 103345420 A | 10/2013 |
| CN | 103516741 A | 1/2014 |
| CN | 103701761 A | 4/2014 |
| CN | 103856446 A | 6/2014 |
| CN | 104717284 A | 6/2015 |
| CN | 104732331 A | 6/2015 |
| WO | 03040942 A1 | 5/2003 |

OTHER PUBLICATIONS

The State Intellectual Property Office of the People's Republic of China (SIPO) Office Action 1 for 201510080521.7 dated Aug. 22, 2016.

* cited by examiner

METHOD, APPARATUS, AND SYSTEM FOR MANAGING FOLLOWER ACCOUNTS IN GROUPS

RELATED APPLICATION

This application is a continuation application of PCT Patent Application No. PCT/CN2016/073277, filed on Feb. 3, 2016, which claims priority to claims priority to Chinese Patent Application No. 201510080521.7, entitled "GROUP MANAGEMENT METHOD, APPARATUS, AND SYSTEM", filed on Feb. 13, 2015, the entire contents of both of which are incorporated herein by reference.

FIELD OF THE TECHNOLOGY

Embodiments of the present disclosure relate to the field of computer and Internet technologies, and in particular to a group management method, apparatus, and system.

BACKGROUND OF THE DISCLOSURE

Both an ordinary user and an operator may apply for a user account in a social application. An operator may provide services such as a query service, a notification service, a consultation service and a customer service to an ordinary user by using a social application.

In a related technology, a social application may provide an open platform to an operator, and a user account for which the operator applies in the social application may be referred to as an official account. After following, in the social application, the official account for which the operator applies, the ordinary user may become a follower of the official account. The operator may provide various information and services to the follower by using the open platform.

During implementation of embodiments of the present disclosure, the inventor finds that the foregoing technology at least has the following problem: an operator is lack of properly and effectively managing a user account of a follower (referred to as "follower account" below) following an official account, and this is unfavorable to development and implementation of services.

SUMMARY

According to a first aspect, a group management method is provided, the method including: obtaining an interface address corresponding to a group management operation; generating an interface call request carrying the interface address, the interface call request being used to call a group management interface provided by an open platform server, the group management interface being used to perform the group management operation on a follower account following a target user account, and the target user account being a user account applied by an operator in the open platform server; and sending the interface call request to the open platform server.

Optionally, the group management operation includes at least one of a group creation operation, a group deletion operation, a group query operation, a follower group query operation, a group name modification operation, a follower group movement operation, or a remark name setting operation.

According to a second aspect, a group management method is provided, the method including: receiving, by an open platform server, an interface call request sent by a target user account, the interface call request carrying an interface address corresponding to a group management operation; and calling, by the open platform server, a group management interface corresponding to the interface address according to the interface address to perform the group management operation on a follower account following the target user account.

Optionally, the group management operation includes at least one of a group creation operation, a group deletion operation, a group query operation, a follower group query operation, a group name modification operation, a follower group movement operation, or a remark name setting operation, and the target user account is a user account applied by an operator in the open platform server.

According to a third aspect, a group management apparatus is provided, the apparatus including: at least a processor and one or more modules stored on a memory and executable by the processor. The one or more modules includes: an interface address obtaining module, configured to obtain an interface address corresponding to a group management operation; a call request generation module, configured to generate an interface call request carrying the interface address, the interface call request being used to call a group management interface provided by an open platform server, the group management interface being used to perform the group management operation on a follower account following a target user account, and the target user account being a user account applied by an operator in the open platform server; and a call request sending module, configured to send the interface call request to the open platform server.

Optionally, the group management operation includes at least one of a group creation operation, a group deletion operation, a group query operation, a follower group query operation, a group name modification operation, a follower group movement operation, or a remark name setting operation.

According to a fourth aspect, a group management apparatus is provided, applied to an open platform server, the apparatus including: at least a processor and one or more modules stored on a memory and executable by the processor. The one or more modules includes: a call request receiving module, configured to receive an interface call request sent by a target user account, the interface call request carrying an interface address corresponding to a group management operation; and an interface call module, configured to call a group management interface corresponding to the interface address according to the interface address to perform the group management operation on a follower account following the target user account.

Optionally, the group management operation includes at least one of a group creation operation, a group deletion operation, a group query operation, a follower group query operation, a group name modification operation, a follower group movement operation, or a remark name setting operation, and the target user account is a user account applied by an operator in the open platform server.

According to a fifth aspect, a group management system is provided, the system including: a third party server and an open platform server; the third party server including the group management apparatus according to the third aspect; and the open platform server including the group management apparatus according to the fourth aspect.

BRIEF DESCRIPTION OF THE DRAWINGS

To describe the technical solutions of the embodiments of the present disclosure more clearly, the accompanying drawings for illustrating the embodiments will be introduced briefly in the following. Apparently, the drawings in the following description are only some embodiments of the present disclosure, and a person of ordinary skill in the art may obtain other drawings based on these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

First, some nouns involved in embodiments of the present disclosure are defined and described:

1. User account: refers to an account for which an operator applies on an open platform. The foregoing operator generally refers to an organization or individual to which users pay much attention, such as a merchant, an enterprise, a government, media, or a celebrity. Such user account may be also referred to as an official account.

2. Operator: refers to an owner of a user account, that is, an organization or individual applying for the foregoing user account. The operator is also referred to as an official account operator.

3. Open platform: refers to a platform that provides an interface to a third party server based on an original software system, and enhances functions of the original software system or uses resources of the original software system by means of access of the third party server. For example, the open platform is a Wechat public platform, an Alipay service window platform, or a Baidu Connect open platform. The original software system may be a social application system, a payment application system or another related application system. Using a social application system as an example, after an operator applies for a user account on an open platform in a social application, an ordinary user in the social application system may follow the user account, or be in a friend relationship with the user account. Subsequently, the ordinary user and the operator may exchange information such as a text, a picture, a voice, or a video by using the social application as a medium.

Figure 1:
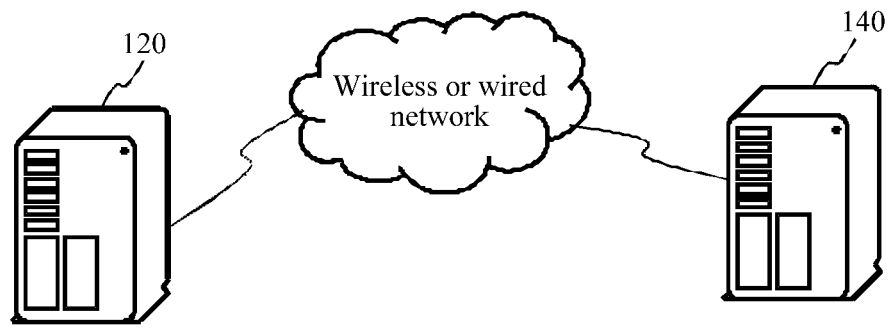
FIG. 1 is a schematic structural diagram of an implementation environment according to an embodiment of the present disclosure.

Referring to FIG. 1, FIG. 1 is a schematic structural diagram of an implementation environment involved in an embodiment of the present disclosure. The implementation environment includes: a third party server 120 and an open platform server 140.

The third party server 120 may be one server, a server cluster formed by several servers, or a cloud computing service center.

The third party server 120 is connected to the open platform server 140 by using a wired network or wireless network.

The open platform server 140 may be one server, a server cluster formed by several servers, or a cloud computing service center. The open platform server 140 is configured to provide an interface to the third party server 120 based on an original software system. For example, the open platform server 140 may provide an interface to the third party server 120 based on a social application system. For example, the open platform server 140 may provide an interface to the third party server 120 based on a Wechat system, to enhance functions of the Wechat system or use resources of the Wechat system.

In a possible implementation manner, the third party server 120 may be a background server used by an operator to provide services to a follower of an official account, and the open platform server 140 may be a public platform server for the different third party server 120 to access.

It should be noted that "the third party" of "the third party server" involved in this embodiment of the present disclosure is described relative to "the open platform server", but it does not mean that "the third party server" and "the open platform server" belong to different owners. Instead, "the third party server" and "the open platform server" may be different servers belonging to a same owner.

In this embodiment of the present disclosure, the open platform server 140 provides a group management interface, and the third party server 120 performs, by calling the group management interface, a group management operation on a follower account following a target user account. The target user account is a user account for which the operator applies in the open platform server 140. The group management operation includes but is not limited to: at least one of a group creation operation, a group deletion operation, a group query operation, a follower group query operation, a group name modification operation, a follower group movement operation, and a remark name setting operation.

Figure 2:
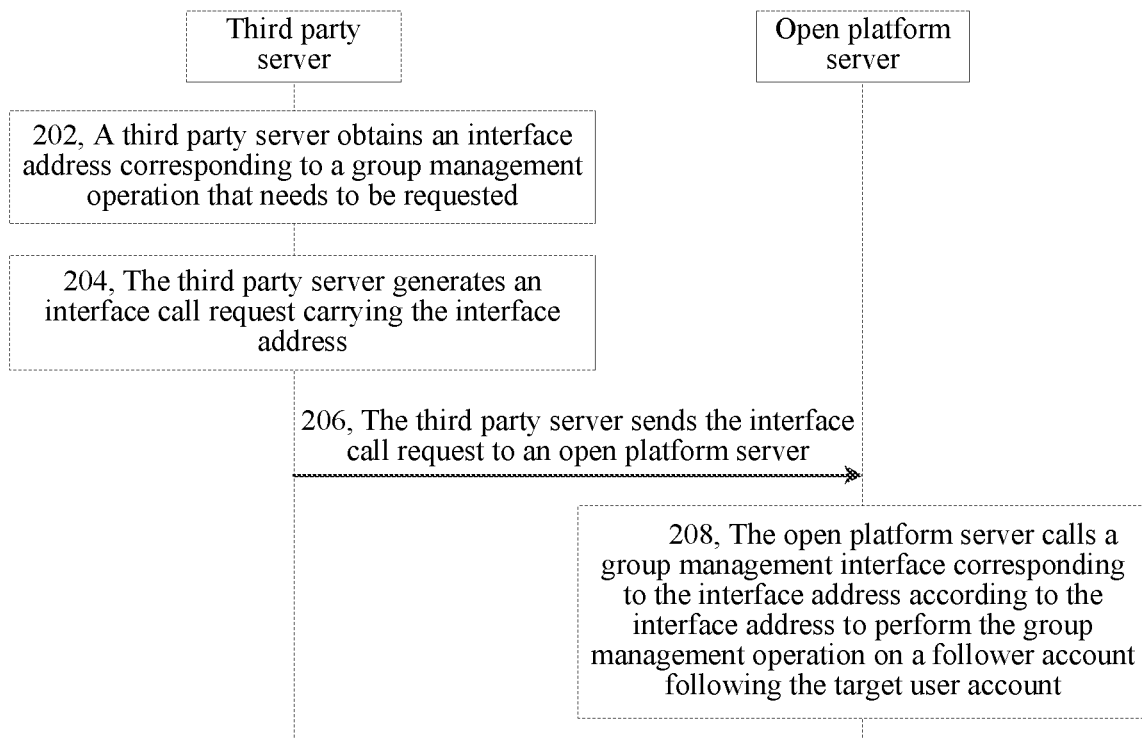
FIG. 2 is a method flowchart of a group management method according to an embodiment of the present disclosure.

Referring to FIG. 2, FIG. 2 is a method flowchart of a group management method according to an embodiment of the present disclosure. This embodiment is described by using an example in which the group management method is applied to the implementation environment shown in FIG. 1. The group management method may include the following several steps:

Step 202: A third party server obtains an interface address corresponding to a group management operation that needs to be requested.

The group management operation includes but is not limited to: at least one of a group creation operation, a group deletion operation, a group query operation, a follower group query operation, a group name modification operation, a follower group movement operation (e.g., regrouping followers, moving one or more followers from one group to another group), and a remark name setting operation. Different types of group management operations correspond to different group management interfaces. For example, group management interfaces sequentially corresponding to the foregoing types of group management operations are: a group creation interface, a group deletion interface, a group query interface, a follower group query interface, a group name modification interface, a follower group movement interface, and a remark name setting interface.

When needing to request one or more group management operations, the third party server obtains an interface address corresponding to the group management operation that needs to be requested. Different group management operations need to be implemented by calling different group management interfaces, and different group management interfaces correspond to different interface addresses, that is, there is a correspondence among a group management operation, a group management interface, and an interface address. For example, the correspondence may be shown in the following Table 1:

TABLE 1

| Group management operation | Group management interface | Interface address |
|---|---|---|
| Group creation operation | Group creation interface | First interface address |
| Group deletion operation | Group deletion interface | Second interface address |
| Group query operation | Group query interface | Third interface address |
| Follower group query operation | Follower group query interface | Fourth interface address |
| Group name modification operation | Group name modification interface | Fifth interface address |
| Follower group movement operation | Follower group movement interface | Sixth interface address |
| Remark name setting operation | Remark name setting interface | Seventh interface address |
| . . . | . . . | . . . |

Correspondingly, when determining that one or more group management operations need to be requested, the third party server obtains, according to the determined group management operation and from the correspondence among a group management operation, a group management interface, and an interface address, an interface address corresponding to the group management operation that needs to be requested by the third party server.

For example, when the group management operation that needs to be requested is the group creation operation, the third party server obtains, according to the group creation operation and from the correspondence among a group management operation, a group management interface, and an interface address that is shown in Table 1, the first interface address corresponding to the group creation operation.

Step 204: The third party server generates an interface call request carrying the interface address.

The interface call request is used to call a group management interface provided by an open platform server, and the group management interface is used to perform a group management operation on a follower account following a target user account. The target user account is a user account for which an operator applies in the open platform server, the follower account is a user account registered in an open platform, and the user account follows the target user account. The operator provides services to a follower of the target user account by using the third party server.

Specifically, in this embodiment, the interface call request is used to call a group management interface that corresponds to an interface address and that is provided by the open platform server to the third party server, and the group management interface corresponding to the interface address is used to perform a corresponding group management operation on a follower account following the target user account.

Optionally, a request protocol used by the interface call request may be the HTTP (Hypertext Transfer Protocol), or may be the HTTPS (Hyper Text Transfer Protocol over Secure Socket Layer), or another self-defined protocol. A request manner used by the interface call request may be a POST request manner or GET request manner.

Step 206: The third party server sends the interface call request to the open platform server.

The third party server sends the interface call request to the open platform server by using the target user account.

Corresponding, the open platform server receives the interface call request sent by the third party server.

Step 208: The open platform server calls a group management interface corresponding to the interface address according to the interface address to perform, by using the group management interface, the group management operation on a follower account following the target user account.

For example, when the interface call request carries a first interface address, the open platform server calls a group creation interface corresponding to the first interface address, and performs a group creation operation by using the group creation interface.

It should be noted that step 202 to step 206 may be independently implemented to become a group management method on the third party server side, and step 208 may be independently implemented to become a group management method on the open platform server side.

It should be further noted that this embodiment is described only by using an example in which the operator of the target user account interacts with the open platform server by using the third party server. In another possible implementation manner, the operator of the target user account may interact with the open platform server by using a client program. Alternatively, the operator of the target user account may log in to the third party server by using a client program, and control the third party server by using the client program to interact with the open platform server. This is not limited in this embodiment.

To sum up, according to the group management method provided in this embodiment, by calling a group management interface provided by an open platform server, a third party server performs a group management operation on a follower account following a target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service.

Additionally, according to the group management method provided in this embodiment, different group management interfaces are further provided to the third party server, and the third party server may call the different group management interfaces to implement different types of group management operations, so that an operator of a user account manages a follower account more flexibly and efficiently.

Figure 3:
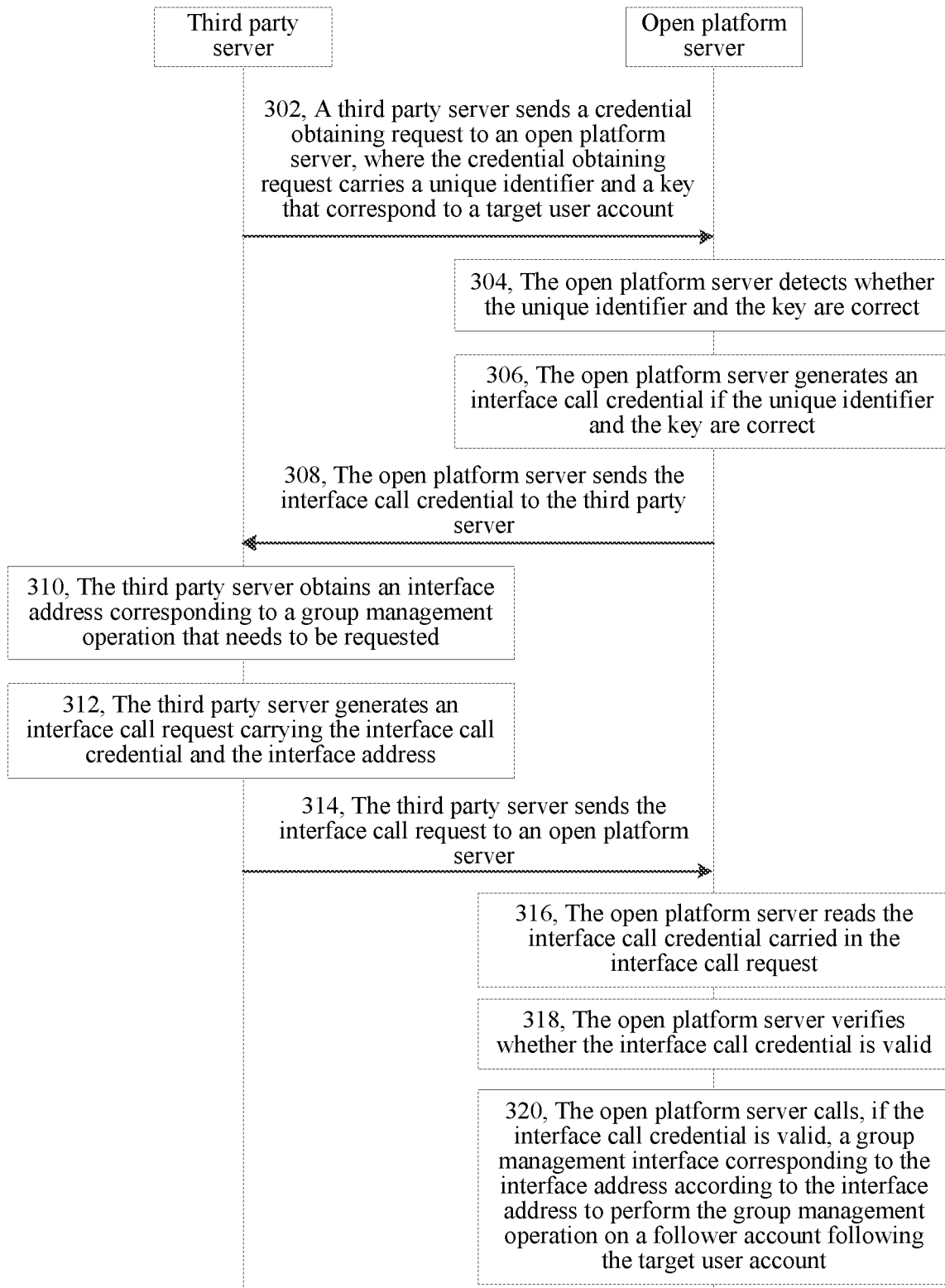
FIG. 3 is a method flowchart of a group management method according to another embodiment of the present disclosure.

Referring to FIG. 3, FIG. 3 is a method flowchart of a group management method according to another embodiment of the present disclosure. This embodiment is described by using an example in which the group management method is applied to the implementation environment shown in FIG. 1. The group management method may include the following several steps:

Step 302: A third party server sends a credential obtaining request to an open platform server, where the credential obtaining request carries a unique identifier and a key that correspond to a target user account.

The unique identifier and the key are obtained by the third party server in advance from the open platform server. Optionally, the third party server may store the unique identifier and the key, and when needing to request a group management operation, the third party server may directly obtain the stored unique identifier and key locally, thereby improving obtaining efficiency.

To improve key security, after registering the unique identifier and the key, an operator may further periodically or aperiodically replace the key on the open platform server.

Optionally, whenever the operator replaces the key on the open platform server, a development platform sends a new key obtained through replacement to the third party server, and the third party server receives the new key, and updates the locally stored key to the new key.

For example, after completing registration of the foregoing target user account, the open platform server may send the corresponding unique identifier and key to the third party server, and the third party server receives the unique identifier and the key, and stores the unique identifier and the key.

Optionally, the third party server may call a credential obtaining interface provided by the open platform server, and the credential obtaining interface is used to provide an interface call credential to the third party server.

For example, a request protocol used by the credential obtaining request is the HTTPS, and a request manner is a GET request manner. A request example of the credential obtaining request is as follows: https://api.xxxxx.com/cgi-bin/token?grant_type=client_credential
&appid=APPID&secret=APPSECRET Descriptions about parameters in the credential obtaining request are shown in Table 2:

TABLE 2

| Parameter | Description |
| --- | --- |
| grant_type | Used to instruct to obtain an interface call credential access_token |
| appid | Unique identifier |
| secret | Key |

Corresponding, the open platform server receives the credential obtaining request sent by the third party server.

Step 304: The open platform server detects whether the unique identifier and the key are correct.

The open platform server stores a correspondence between a unique identifier and a key, and the correspondence is used to store the unique identifier and the key that are registered by the operator in the open platform server.

When the operator replaces the key corresponding to the unique identifier of the operator, the open platform server obtains a new key obtained through replacement, and updates, in the correspondence, the key corresponding to the unique identifier of the operator to the new key.

Optionally, this step may be: the open platform server obtains, according to the unique identifier corresponding to the target user account, a corresponding key from the correspondence between a unique identifier and a key, and compares the obtained key with the key corresponding to the target user account. If the two are the same, the open platform server detects that the unique identifier and the key that correspond to the target user account are correct. If the two are different, the open platform server detects that the unique identifier and the key that correspond to the target user account are incorrect.

Step 306: The open platform server generates an interface call credential if the unique identifier and the key are correct.

The interface call credential is a credential according to which the third party server requests to call the group management interface. The open platform server may generate the interface call credential according to the unique identifier and the key that correspond to the target user account. For example, the unique identifier and the key are calculated according to a predetermined algorithm to obtain the interface call credential. The interface call credential may be a character string. Alternatively, in another possible implementation manner, the interface call credential may be a character string generated randomly.

Optionally, the open platform server may set a credential valid time corresponding to the interface call credential. Within the credential valid time, the interface call credential is valid; otherwise, the interface call credential times out and is invalid.

Step 308: The open platform server sends the interface call credential to the third party server.

For example, the open platform server sends return data in a JSON (JavaScript Object Notation, a lightweight data exchange format) format to the third party server, and the return data is as follows: {"access_token":"ACCESS_TOKEN","expires_in":7200}

Descriptions about parameters in the return data are shown in Table 3:

TABLE 3

| Parameter | Description |
| --- | --- |
| access_token | Interface call credential |
| expires_in | Credential valid time, unit: second |

Corresponding, the third party server receives the interface call credential sent by the open platform server.

Optionally, after generating the interface call credential, the open platform server stores the interface call credential that is to be used in subsequent verification. Moreover, when the credential valid time of the interface call credential is exceeded, the open platform server deletes the interface call credential.

Additionally, when the unique identifier and the key are incorrect, the open platform server may return an error code and/or error information to the third party server.

Step 310: The third party server obtains an interface address corresponding to a group management operation that needs to be requested.

When needing to request one or more group management operations, the third party server obtains an interface address corresponding to the group management operation that needs to be requested. The correspondence is already introduced and described in detail in the foregoing embodiment shown in FIG. 3, and this is not described in detail again in this embodiment.

Step 312: The third party server generates an interface call request carrying the interface call credential and the interface address.

Different from the embodiment shown in FIG. 2, in this embodiment, the interface call request further carries the interface call credential.

Step 314: The third party server sends the interface call request to the open platform server.

Corresponding, the open platform server receives the interface call request sent by the third party server.

Step 316: The open platform server reads the interface call credential carried in the interface call request.

Step 318: The open platform server verifies whether the interface call credential is valid.

The open platform server may verify whether the interface call credential is correct, and verify whether the interface call credential times out. If the interface call credential is correct and does not time out, it indicates that the interface call credential is valid.

Optionally, the foregoing two verification operations may be: the open platform server searches for whether the interface call credential is locally stored; if the interface call credential is locally stored, it indicates that the interface call credential is correct, and then the open platform server obtains the credential valid time of the interface call credential, and determines whether a current time exceeds the credential valid time; and if the current time does not exceed the credential valid time, it indicates that the interface call credential is valid.

Step 320: The open platform server calls, if the interface call credential is valid, a group management interface corresponding to the interface address according to the interface address to perform the group management operation on a follower account following the target user account.

Optionally, when the interface call credential is invalid, for example, the interface call credential is incorrect or the interface call credential times out, the open platform server may directly end the process, or may return a corresponding error code and/or corresponding error information to the third party server. Alternatively, when the interface call request does not carry the interface call credential, the open platform server may directly end the process, or may return a corresponding error code and/or corresponding error information to the third party server.

It should be noted that step 302, and step 310 to step 314 may be independently implemented to become a group management method on the third party server side, and step 304 to step 308, and step 316 to step 320 may be independently implemented to become a group management method on the open platform server side.

It should be further noted that this embodiment is described only by using an example in which the operator of the target user account interacts with the open platform server by using the third party server. In another possible implementation manner, the operator of the target user account may interact with the open platform server by using a client program. Alternatively, the operator of the target user account may log in to the third party server by using a client program, and control the third party server by using the client program to interact with the open platform server. This is not limited in this embodiment.

To sum up, according to the group management method provided in this embodiment, by calling a group management interface provided by an open platform server, a third party server performs a group management operation on a follower account following a target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service.

Additionally, according to the group management method provided in this embodiment, a right that the third party server has to call the group management interface is further managed and maintained by using the interface call credential, so as to prevent some malicious persons from obtaining group information and follower information that correspond to the target user account, or tampering a follower group corresponding to the target user account, thereby ensuring security of the group information and the follower information, and additionally providing a security guarantee of calling the group management interface.

Different types of group management operations are separately introduced and described below.

1. If a group management operation that needs to be requested includes a group creation operation, and the group creation operation corresponds to a first interface address, the interface call request carries a group name of a follower group that needs to be created, and the first interface address. Correspondingly, step 208 includes: calling, by the open platform server, a group creation interface corresponding to the first interface address to create a follower group corresponding to the target user account, and setting a corresponding group name.

The group creation interface is used to create the follower group.

For example, when the group management operation needing to be requested is the group creation operation, the third party server may generate a first interface call request. A request protocol used by the first interface call request is the HTTPS, and a request manner is a POST request manner. A request example of the first interface call request is as follows: https://api.xxxxx.com/cgi-bin/groups/create?-access_token=ACCESS_TOKEN An example of POST data carried in the first interface call request is as follows: {"group": {"name":"test"}}

Descriptions about parameters in the first interface call request are shown in Table 4:

TABLE 4

| Parameter | Description |
| --- | --- |
| access_token | Interface call credential |
| name | Group name |

Correspondingly, after receiving the first interface call request, the open platform server may verify whether the interface call credential is valid, and perform, if the interface call credential is valid, a group creation operation according to a parameter carried in the first interface call request.

It should be noted that the interface call credential may carry related information of the unique identifier corresponding to the target user account, and the related information is used to indicate the target user account on which the open platform server determines that a group management operation needs to be performed.

Optionally, after completing the group creation operation, the open platform server may send return data to the third party server. The return data may include a group identifier corresponding to the created follower group. For example, an example of the return data is as follows:

```
{
    "group": {
        "id": 107,
        "name": "test"
    }
}
```

Descriptions about parameters in the return data are shown in Table 5:

TABLE 5

| Parameter | Description |
|---|---|
| id | Group identifier, allocated by the open platform server |
| name | Group name |

In a specific example, it is assumed that the operator of the target user account logs in to the third party server by using a client program, and controls the third party server by using the client program to call the group management interface provided by the open platform server to perform the group management operation. After the client program logs in to the third party server, the third party server may provide a visual operation interface shown in FIG. 4A to the client program. The visual operation interface includes a "create group" button 41. After the operator clicks the "create group" button 41, a prompt box 42 for inputting a group name occurs, and the operator inputs a group name in the prompt box 42, and clicks a "confirm" button to perform submittal. Correspondingly, the client program controls, according to the foregoing operation of the operator, the third party server to call the group creation interface provided by the open platform server, and creates, by using the group creation interface, a follower group corresponding to the group name input by the operator.

2. If a group management operation that needs to be requested includes a group deletion operation, and the group deletion operation corresponds to a second interface address, the interface call request carries a group identifier of a follower group that needs to be deleted, and the second interface address. Correspondingly, step 208 includes: calling, by the open platform server, a group deletion interface corresponding to the second interface address, and deleting the follower group corresponding to the group identifier by using the group deletion interface.

The group deletion interface is used to delete the follower group.

For example, when the group management operation needing to be requested is the group deletion operation, the third party server may generate a second interface call request. A request protocol used by the second interface call request is the HTTPS, and a request manner is a POST request manner.

Figure 4A:
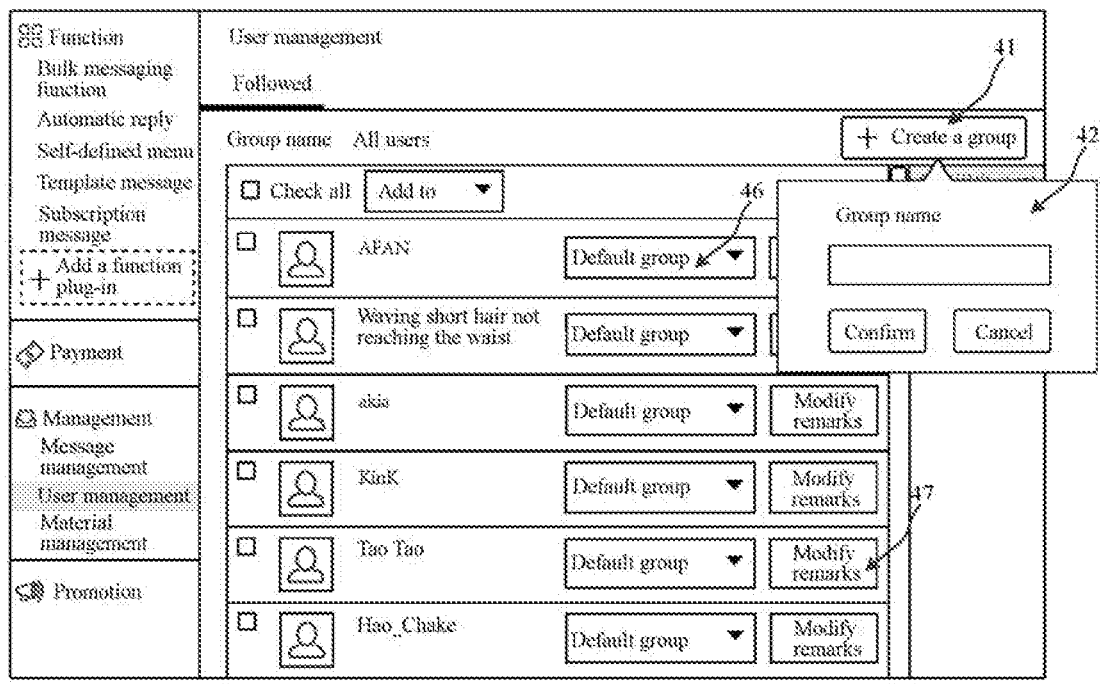
FIG. 4A and FIG. 4B are schematic diagrams of interfaces involved in a group management method according to another embodiment of the present disclosure.
Figure 4B:
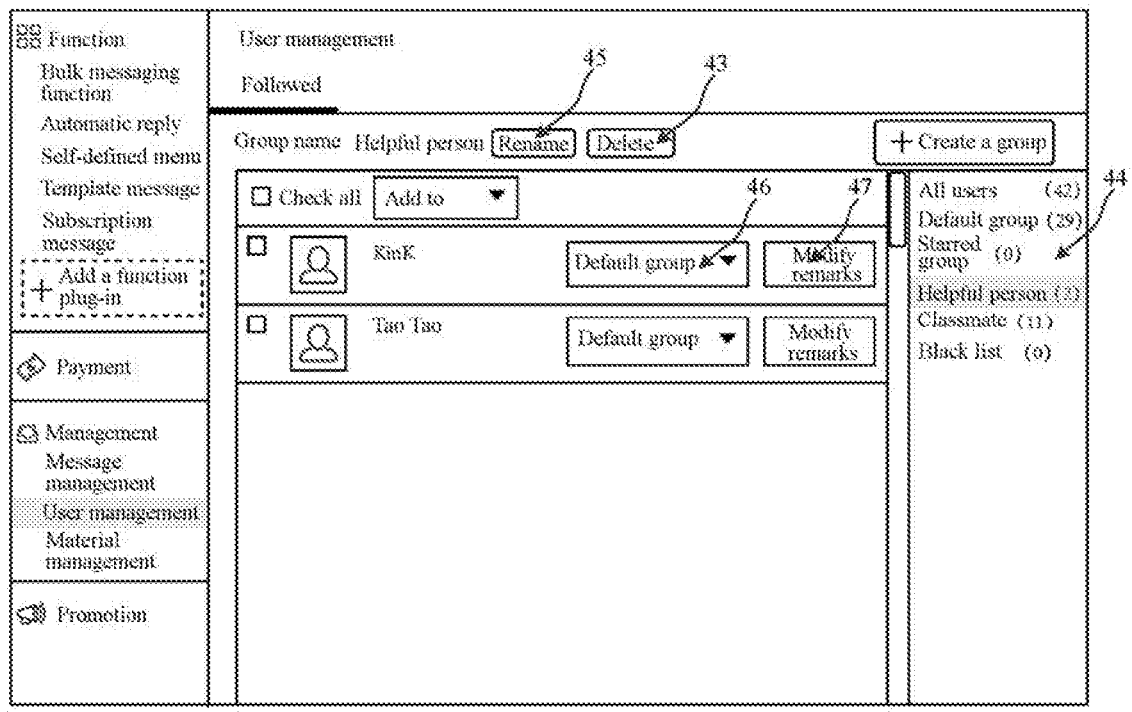

As shown in FIG. 4B, FIG. 4B is a schematic diagram of another visual operation interface provided by the third party server to the client program. In a follower group whose group name is "helpful person", a corresponding "delete" button 43 is set. After the operator clicks the "delete" button 43, the third party server is triggered to call the group deletion interface provided by the open platform server, and the follower group whose group name is "helpful person" is deleted by using the group deletion interface.

3. If the group management operation that needs to be requested includes a group query operation, and the group query operation corresponds to a third interface address, the interface call request carries the third interface address. Correspondingly, step 208 includes: calling, by the open platform server, a group query interface corresponding to the third interface address to obtain a group information list corresponding to the target user account, and sending the group information list to the third party server.

The group query interface is used to query all follower groups corresponding to the target user account.

For example, when the group management operation needing to be requested is the group query operation, the third party server may generate a third interface call request. A request protocol used by the third interface call request is the HTTPS, and a request manner is a GET request manner. A request example of the third interface call request is as follows: https://api.xxxxx.com/cgi-bin/groups/get?access_token=ACCESS_TOKEN Correspondingly, after receiving the third interface call request, the open platform server may verify whether the interface call credential is valid, and call the group query interface according to the third interface address carried in the third interface call request (that is, api.xxxxx.com/cgi-bin/groups/get) to obtain a group information list corresponding to the target user account. The group information list may include at least one of group identifiers, group names, and group follower quantities of all follower groups corresponding to the target user account.

Additionally, after receiving the group information list sent by the open platform server, the third party server may display the group information list, so as to provide the group information list to the operator of the user account. For example, in FIG. 4B, the third party server displays a group information list 44 on a visual interface provided to the client program.

4. If the group management operation that needs to be requested includes a follower group query operation, and the follower group query operation corresponds to a fourth interface address, the interface call request carries an identity of a target follower (e.g., user ID of the follower account) that needs to be queried, and the fourth interface address. Correspondingly, step 208 includes: calling, by the open platform server, a follower group query interface corresponding to the fourth interface address to obtain a group identifier corresponding to the identity, and sending the group identifier to the third party server.

The follower group query interface is used to query a follower group of the target follower.

For example, when the group management operation needing to be requested is the follower group query operation, the third party server may generate a fourth interface call request. A request protocol used by the fourth interface call request is the HTTPS, and a request manner is a POST request manner.

Additionally, after receiving the group identifier sent by the open platform server, the third party server may display a group name corresponding to the group identifier, so as to provide the group name to the operator of the user account. Certainly, in another possible implementation manner, the open platform server may obtain the group name corresponding to the group identifier through query, and send the group name to the third party server, and this is not limited in this embodiment.

5. If the group management operation that needs to be requested includes a group name modification operation, and the group name modification operation corresponds to a fifth interface address, the interface call request carries a group identifier of a follower group that needs to be renamed, a name of the renamed group, and the fifth interface address. Correspondingly, step 208 includes: calling, by the open platform server, a group name modification interface corresponding to the fifth interface address to modify an original group name of the follower group corresponding to the group identifier into the name of the renamed group.

The group name modification interface is used to rename the group name of the follower group.

For example, when the group management operation needing to be requested is the group name modification operation, the third party server may generate a fifth interface call request. A request protocol used by the fifth interface call request is the HTTPS, and a request manner is a POST request manner.

Optionally, after completing the group name modification operation, the open platform server may send, to the third party server, return data that is used to indicate successful modification.

As shown in FIG. 4B, in a follower group whose group name is "helpful person", a corresponding "rename" button 45 is set. After the operator clicks the "rename" button 45, a prompt box (not shown in the figure) for inputting a group name occurs, and the operator inputs a name of the renamed group in the prompt box, and clicks a "confirm" button to perform submittal. Correspondingly, the client program controls the third party server according to the foregoing operation of the operator to call the group name modification interface provided by the open platform server, and modifies the group name "helpful person" of the follower group into a name of the renamed group by using the group name modification interface.

6. If the group management operation that needs to be requested includes a follower group movement operation, and the follower group movement operation corresponds to a sixth interface address, the interface call request carries an identity of a target follower that needs to be moved, a group identifier of a target follower group, and the sixth interface address. Correspondingly, step 208 includes: calling, by the open platform server, a follower group movement interface corresponding to the sixth interface address to move the corresponding target follower from an original follower group to the target follower group according to the identity and the group identifier.

The follower group movement interface is used to move the target follower from the original follower group to the target follower group.

For example, when the group management operation needing to be requested is the follower group movement operation, the third party server may generate a sixth interface call request. A request protocol used by the sixth interface call request is the HTTPS, and a request manner is a POST request manner.

Optionally, after completing the movement operation, the open platform server may send, to the third party server, return data that is used to indicate successful movement.

As shown in FIG. 4A/4B, an operation control 46 for moving a follower group is set beside each follower, and the operator may move any follower to any created target follower group by using the operation control 46. Further, the operator may select multiple followers to perform a same group management operation (e.g., moving to a same desired group). Correspondingly, the client program controls the third party server according to the foregoing operation of the operator to call the follower group movement interface provided by the open platform server, and moves, by using the follower group movement interface, a follower selected by the operator to target follower group selected by the operator.

7. If the group management operation that needs to be requested includes a remark name setting operation, and the remark name setting operation corresponds to a seventh interface address, the interface call request carries an identity of a target follower that needs to be set, a remark name, and the seventh interface address. Correspondingly, step 208 includes: calling, by the open platform server, a remark name setting interface corresponding to the seventh interface address to set the remark name of the corresponding target follower according to the identifier (i.e., identity of the target follower) and the remark name.

The remark name setting interface is used to set the remark name of the target follower.

For example, when the group management operation needing to be requested is the remark name setting operation, the third party server may generate a seventh interface call request. A request protocol used by the seventh interface call request is the HTTPS, and a request manner is a POST request manner.

Optionally, after completing the remark name setting, the open platform server may send, to the third party server, return data that is used to indicate successful setting.

As shown in FIG. 4A/4B, a "remark modification" button 47 is set beside each follower, and the operator may set/modify a remark name of any follower by using the "remark modification" button 47. Correspondingly, the client program controls the third party server according to the foregoing operation of the operator to call the remark name setting interface provided by the open platform server, and completes a corresponding remark name setting operation by using the remark name setting interface.

It should be noted that one interface call request may call one interface, so as to implement a group management operation corresponding to the interface; or one interface call request may simultaneously call multiple different interfaces, so as to implement different types of group management operations corresponding to the multiple different interfaces. This is not limited in this embodiment.

It should be further noted that the foregoing embodiments are described only by using an example in which group management is performed on a follower account in an interface call manner, and in another possible implementation manner, the third party server may directly log in to the open platform server, and perform group management operations by using a visual interface provided by the open platform server. This is not limited in this embodiment.

Apparatus embodiments of the present disclosure are described below, and may be used to perform the method embodiments of the present disclosure. For details not disclosed in the apparatus embodiments of the present disclosure, refer to the method embodiments of the present disclosure.

Figure 5:
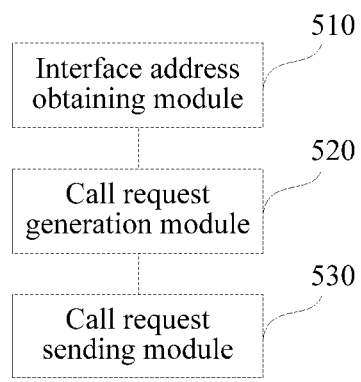
FIG. 5 is a structural block diagram of a group management apparatus according to an embodiment of the present disclosure.

Referring to FIG. 5, FIG. 5 is a structural block diagram of a group management apparatus according to an embodiment of the present disclosure. In a possible implementation manner, the group management apparatus may be implemented by using software, hardware or a combination of the two to become a part or all of a third party server. The group management apparatus may include: an interface address obtaining module 510, a call request generation module 520 and a call request sending module 530.

The interface address obtaining module 510 is configured to obtain an interface address corresponding to a group management operation that needs to be requested, where the group management operation includes at least one of a group creation operation, a group deletion operation, a group query operation, a follower group query operation, a group name modification operation, a follower group movement operation, and a remark name setting operation.

The call request generation module 520 is configured to generate an interface call request carrying the interface address, the interface call request being used to call a group management interface provided by an open platform server, the group management interface being used to perform the group management operation on a follower account following a target user account, and the target user account being a user account for which an operator applies in the open platform server.

The call request sending module 530 is configured to send the interface call request to the open platform server.

To sum up, by calling a group management interface provided by an open platform server, the group management apparatus provided in this embodiment performs a group management operation on a follower account following a target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service.

Figure 6:
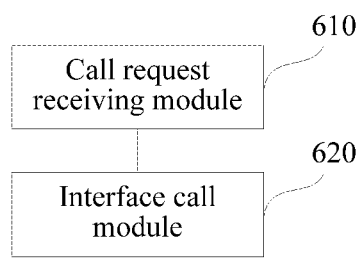
FIG. 6 is a structural block diagram of a group management apparatus according to another embodiment of the present disclosure.

Referring to FIG. 6, FIG. 6 is a structural block diagram of a group management apparatus according to another embodiment of the present disclosure. The group management apparatus may be implemented by using software, hardware or a combination of the two to become a part or all of an open platform server. The group management apparatus may include: a call request receiving module 610 and an interface call module 620.

The call request receiving module 610 is configured to receive an interface call request sent by a target user account, where the interface call request carries an interface address corresponding to a group management operation that needs to be requested, and the group management operation includes at least one of a group creation operation, a group deletion operation, a group query operation, a follower group query operation, a group name modification operation, a follower group movement operation, and a remark name setting operation, and the target user account is a user account for which an operator applies in the open platform server.

The interface call module 620 is configured to call a group management interface corresponding to the interface address according to the interface address to perform the group management operation on a follower account following the target user account.

To sum up, according to the group management apparatus provided in this embodiment, the open platform server provides a group management interface to a target user account, and performs, by calling the group management interface, a group management operation on a follower account following the target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service.

Figure 7:
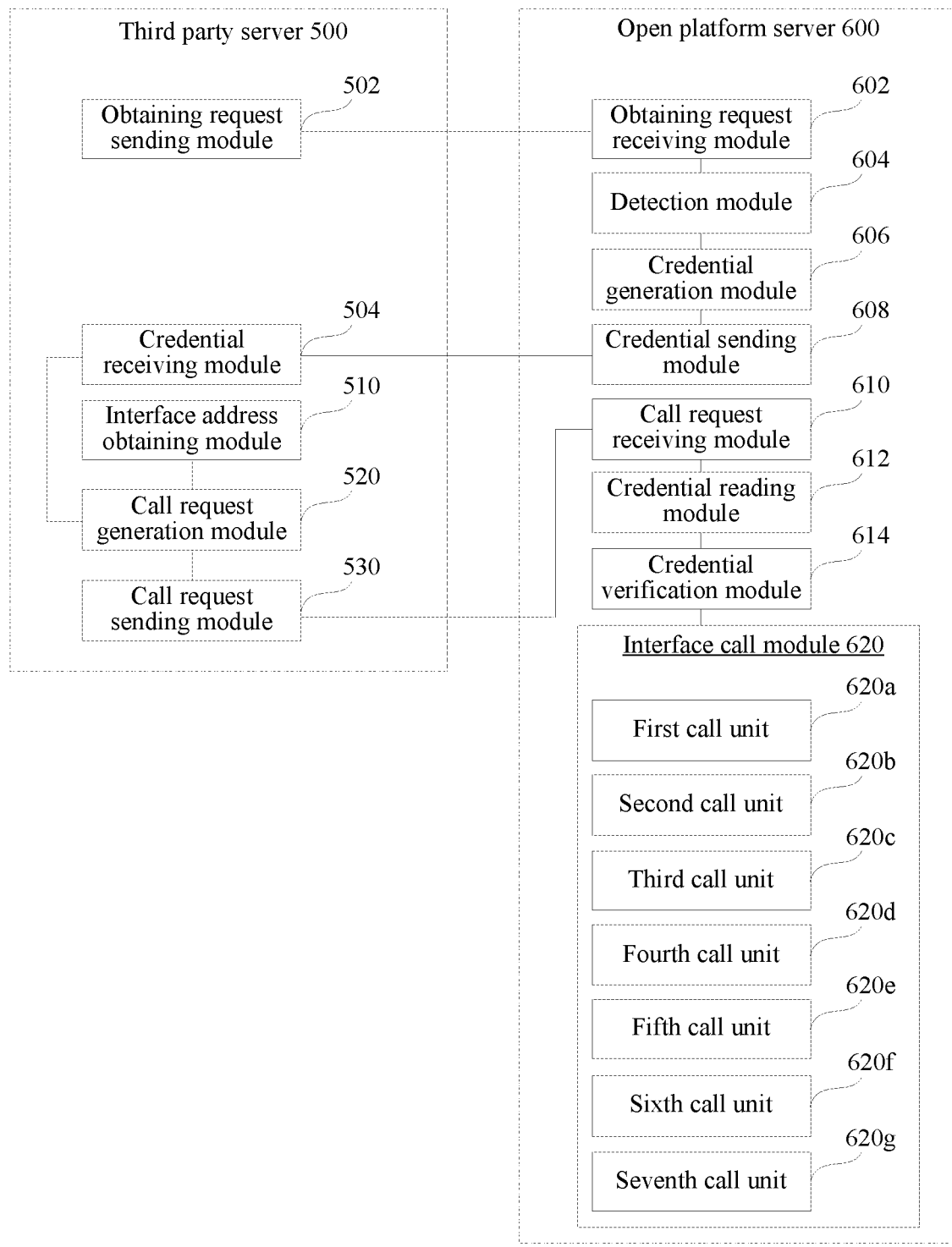
FIG. 7 is a structural block diagram of a group management system according to an embodiment of the present disclosure.

Referring to FIG. 7, FIG. 7 is a structural block diagram of a group management system according to an embodiment of the present disclosure. The group management system may include: a third party server 500 and an open platform server 600. The third party server 500 may be connected to the open platform server 600 by using a wired network or wireless network.

The third party server 500 may include a group management apparatus. The group management apparatus may be implemented by using software, hardware or a combination of the two to become a part or all of the third party server 500. The group management apparatus may include: an interface address obtaining module 510, a call request generation module 520 and a call request sending module 530.

The interface address obtaining module 510 is configured to obtain an interface address corresponding to a group management operation that needs to be requested, where the group management operation includes at least one of a group creation operation, a group deletion operation, a group query operation, a follower group query operation, a group name modification operation, a follower group movement operation, and a remark name setting operation.

The call request generation module 520 is configured to generate an interface call request carrying the interface address, the interface call request being used to call a group management interface provided by the open platform server 600, the group management interface being used to perform the group management operation on a follower account following a target user account, and the target user account being a user account for which an operator applies in the open platform server 600.

The call request sending module 530 is configured to send the interface call request to the open platform server 600.

Optionally, the apparatus further includes: an obtaining request sending module 502 and a credential receiving module 504.

The obtaining request sending module 502 is configured to send a credential obtaining request to the open platform server 600, where the credential obtaining request carries a unique identifier and a key that correspond to the target user account.

The credential receiving module 504 is configured to receive an interface call credential sent by the open platform server 600.

The call request generation module 520 is specifically configured to generate the interface call request carrying the interface call credential and the interface address.

Optionally, the group management operation that needs to be requested includes the group creation operation, the group creation operation corresponds to a first interface address, and the interface call request carries a group name of a follower group that needs to be created, and the first interface address; and/or the group management operation that needs to be requested includes the group deletion operation, the group deletion operation corresponds to a second interface address, and the interface call request carries a group identifier of a follower group that needs to be deleted, and the second interface address; and/or the group management operation that needs to be requested includes the group query operation, the group query operation corresponds to a third interface address, and the interface call request carries the third interface address; and/or the group management operation that needs to be requested includes the follower group query operation, the follower group query operation corresponds to a fourth interface address, and the interface call request carries an identity of a target follower that needs to be queried, and the fourth interface address; and/or the group management operation that needs to be requested includes the group name modification operation, the group name modification operation corresponds to a fifth interface address, and the interface call request carries a group identifier of a follower group that needs to be renamed, a name of the renamed group, and the fifth interface address; and/or the group management operation that needs to be requested includes the follower group movement operation, the follower group movement operation corresponds to a sixth interface address, and the interface call request carries an identity of a target follower that needs to be moved, a group identifier of a target follower group, and the sixth interface address; and/or the group management operation that needs to be requested includes the remark name setting operation, the remark name setting operation corresponds to a seventh interface address, and the interface call request carries an identity of a target follower that needs to be set, a remark name, and the seventh interface address.

The open platform server 600 may include a group management apparatus. The group management apparatus may be implemented by using software, hardware or a combination of the two to become a part or all of the open platform server 600. The group management apparatus may include: a call request receiving module 610 and an interface call module 620.

The call request receiving module 610 is configured to receive an interface call request sent by a target user account (in this embodiment, that is, the third party server 500), where the interface call request carries an interface address corresponding to a group management operation that needs to be requested, and the group management operation includes at least one of a group creation operation, a group deletion operation, a group query operation, a follower group query operation, a group name modification operation, a follower group movement operation, and a remark name setting operation, and the target user account is a user account for which an operator applies in the open platform server 600.

The interface call module 620 is configured to call a group management interface corresponding to the interface address according to the interface address to perform the group management operation on a follower account following the target user account.

Optionally, the interface call module 620 includes: a first call unit 620a, configured to call, when the interface call request carries a first interface address and a group name of a follower group that needs to be created and the first interface address corresponds to a group creation interface, the group creation interface corresponding to the first interface address to create the follower group corresponding to the target user account, and setting the corresponding group name; and/or a second call unit 620b, configured to call, when the interface call request carries a second interface address and a group identifier of a follower group that needs to be deleted and the second interface address corresponds to a group deletion interface, the group deletion interface corresponding to the second interface address to delete the follower group corresponding to the group identifier; and/or a third call unit 620c, configured to call, when the interface call request carries a third interface address and the third interface address corresponds to a group query interface, the group query interface corresponding to the third interface address to obtain a group information list corresponding to the target user account, and feeding back the group information list to the target user account; and/or a fourth call unit 620d, configured to call, when the interface call request carries a fourth interface address and an identity of a target follower that needs to be queried and the fourth interface address corresponds to a follower group query interface, the follower group query interface corresponding to the fourth interface address to obtain a group identifier corresponding to the identity, and feeding back the group identifier to the target user account; and/or a fifth call unit 620e, configured to call, when the interface call request carries a fifth interface address, a group identifier of a follower group that needs to be renamed, and a name of the renamed group and the fifth interface address corresponds to a group name modification interface, the group name modification interface corresponding to the fifth interface address to modify an original group name of the follower group corresponding to the group identifier into the name of the renamed group; and/or a sixth call unit 620f, configured to call, when the interface call request carries a sixth interface address, an identity of a target follower that needs to be moved, and a group identifier of a target follower group and the sixth interface address corresponds to a follower group movement interface, the follower group movement interface corresponding to the sixth interface address to move the corresponding target follower from an original follower group into the target follower group according to the identity and the group identifier; and/or a seventh call unit 620g, configured to call, when the interface call request carries a seventh interface address, an identity of a target follower that needs to be set, and a remark name and the seventh interface address corresponds to a remark name setting interface, the remark name setting interface corresponding to the seventh interface address to set the remark name of the corresponding target follower according to the identifier and the remark name.

Optionally, the apparatus further includes: an obtaining request receiving module 602, a detection module 604, a credential generation module 606 and a credential sending module 608.

The obtaining request receiving module 602 is configured to receive a credential obtaining request sent by the target user account, where the credential obtaining request carries a unique identifier and a key that correspond to the target user account.

The detection module 604 is configured to detect whether the unique identifier and the key are correct.

The credential generation module 606 is configured to generate, when the unique identifier and the key are correct, an interface call credential.

The credential sending module 608 is configured to feed back the interface call credential to the target user account.

Optionally, the interface call request carries the interface call credential, and the apparatus further includes: a credential reading module 612 and a credential verification module 614.

The credential reading module 612 is configured to read the interface call credential carried in the interface call request.

The credential verification module 614 is configured to verify whether the interface call credential is valid.

The interface call module 620 is specifically configured to call, when the interface call credential is valid, the group management interface according to the interface call request to perform the group management operation on the follower account following the target user account.

To sum up, according to the group management system provided in this embodiment, by calling a group management interface provided by an open platform server, a third party server performs a group management operation on a follower account following a target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service.

Additionally, according to the group management system provided in this embodiment, the open platform server further provides different group management interfaces, and the third party server may call the different group management interfaces to implement different types of group management operations, so that an operator of a user account manages a follower account more flexibly and efficiently.

Additionally, the group management system provided in this embodiment further manages and maintains, by using the interface call credential, a right that the third party server has to call the group management interface, so as to prevent some malicious persons from obtaining group information and follower information that correspond to the target user account, or tampering a follower group corresponding to the target user account, thereby ensuring security of the group information and the follower information, and additionally providing a security guarantee of calling the group management interface.

It should be noted that when the group management apparatus and system provided in the foregoing embodiments provide a group management service, description is made only through examples of division of the functional modules. In an actual application, the functions may be assigned according to needs to be implemented by different functional modules, that is, the internal structure of the device is divided into different functional modules, so as to implement all or a part of the functions described above. Furthermore, the embodiments of the group management apparatus and system provided by the embodiments belong to the same idea as the embodiment of the group management method, and the method embodiment may serve as a reference for details of a specific implementation process thereof, which are not repeated herein.

Figure 8:
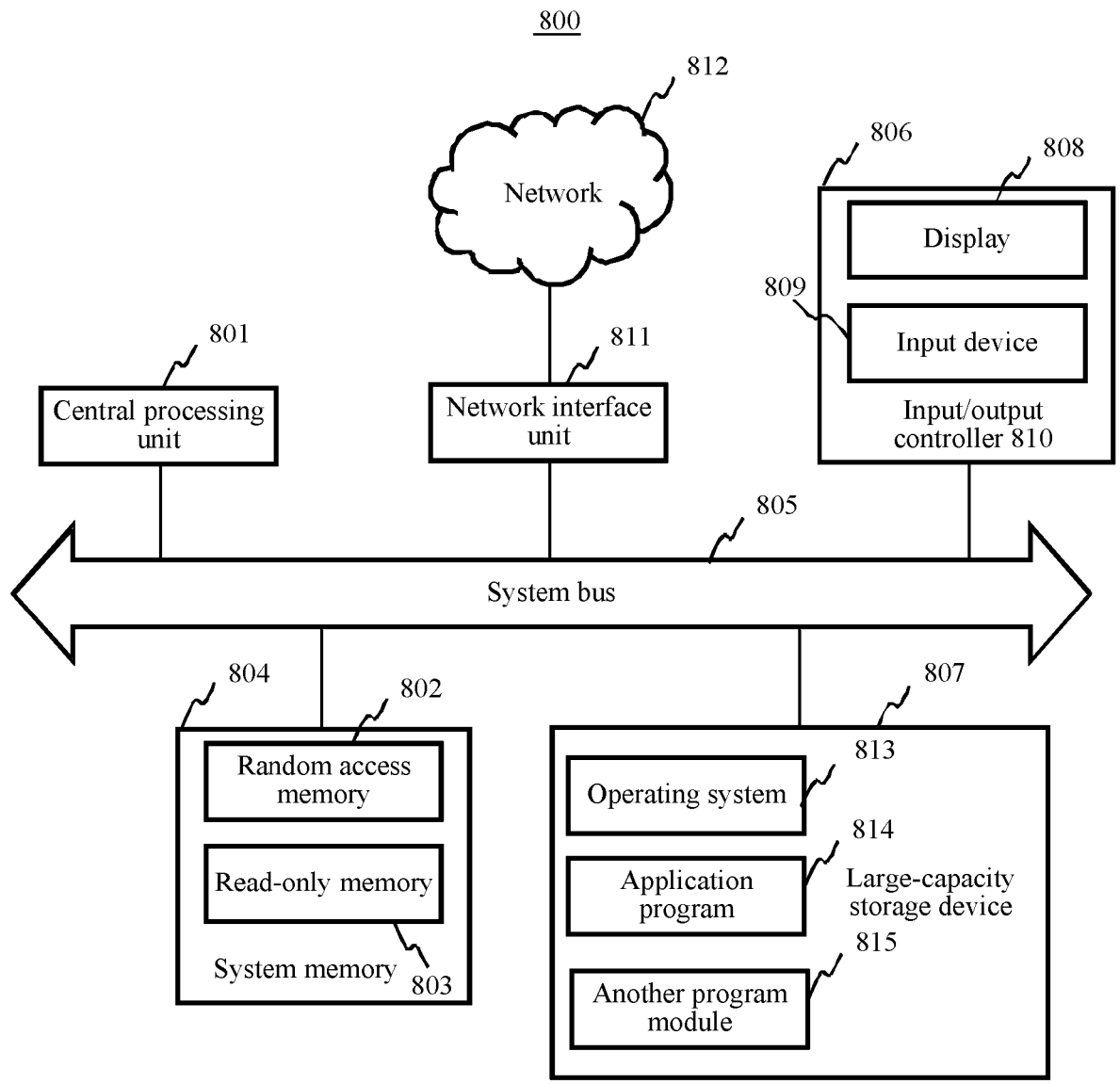
FIG. 8 is a schematic structural diagram of a server according to an embodiment of the present disclosure.

FIG. 8 is a schematic structural diagram of a server according to an embodiment of the present disclosure. The server is configured to implement the group management method provided in the foregoing embodiments. The server may be a third party server, or may be an open platform server. Specifically:

The server 800 includes a central processing unit (CPU) 801, a system memory 804 including a random access memory (RAM) 802 and a read only memory (ROM) 803, and a system bus 805 connecting the system memory 804 and the CPU 801. The server 800 further includes a basic input/output system (I/O system) 806 assisting in transmitting information between devices in a computer, and a large-capacity storage device 807 configured to store an operating system 813, an application program 814 and another program module 815.

The basic I/O system 806 includes a display 808 configured to display information and an input device 809, such as a mouse or a keyboard, configured to input information for a user. The display 808 and the input device 809 are both connected to the CPU 801 by using an input and output controller 810 connected to the system bus 805. The basic I/O system 806 may further include the input and output controller 810 to be configured to receive and process inputs from multiple other devices such as a keyboard, a mouse, and an electronic stylus. Similarly, the input and output controller 810 further provides an output to a display screen, a printer or another type of output device.

The large-capacity storage device 807 is connected to the CPU 801 by using a large-capacity storage controller (not shown) connected to the system bus 805. The large-capacity storage device 807 and its associated computer readable medium provide non-volatile storage for the server 800. That is to say, the large-capacity storage device 807 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in art can know that the computer storage medium is not limited to the foregoing several types. The system memory 804 and the large-capacity storage device 807 may be collectively referred to as a memory.

According to various embodiments of the present disclosure, the server 800 may further be connected, by using a network such as the Internet, to a remote computer on the network and run. That is, the server 800 may be connected to a network 812 by using a network interface unit 811 connected to the system bus 805, or may also be to connected to another type of network or remote computer system (not shown) by using the network interface unit 811.

The memory further includes one or more programs. The one or more programs are stored in the memory and configured to be executed by one or more processors. When the server 800 is a third party server, the foregoing one or more programs include instructions used to execute the foregoing group management method on the third party server side provided in the embodiment shown in FIG. 2 or FIG. 3. When the server 800 is an open platform server, the foregoing one or more programs include instructions used to execute the foregoing group management method on the open platform server side provided in the embodiment shown in FIG. 2 or FIG. 3.

It should be understood that, a singular form "one" ("a", "an", "the") used herein, unless an exceptional case that is clearly supported in the context, aims to also include a plural form. It should also be understood that, the "and/or" used herein indicates any and all possible combinations including one or more than one associated listed items.

The sequence numbers of the preceding embodiments of the present disclosure are merely for description purpose but do not indicate the preference of the embodiments.

By calling a group management interface provided by an open platform server, a group management operation is performed on a follower account following a target user account, so as to resolve the problem existing in the related technology that an official account operator is lack of properly and effectively managing a follower account following an official account, and this is unfavorable to development and implementation of services. By means of group management, the follower account is properly and effectively managed, and moreover it is convenient for a user account operator to develop and implement services such as a group bulk messaging service A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present disclosure, and is not intended to limit the present disclosure. Any modifications, equivalent variations, and improvements made in accordance with the spirits and principles of the present disclosure shall fall within the protection scope of the present disclosure.

What is claimed is:

1. A group management method, comprising:
providing, by a third party server, a visual operation interface to a client program logged in to the third party server, wherein the visual operation interface provides multiple group management operation options including a group creation operation, a group deletion operation, a group query operation, a follower group query operation, a group name modification operation, a follower group movement operation, and a remark name setting operation;
receiving, by the third party server, a request of a group management operation based on user input on the visual operation interface on the client program;
obtaining, by the third party server, an interface address corresponding to the group management operation;
generating, by the third party server, an interface call request carrying the interface address, the interface call request being used to call a group management interface provided by an open platform server, the group management interface being used to perform the group management operation on a follower account following a target user account, and the target user account being a user account applied by an operator in the open platform server, wherein the third party server is a background server used by the operator of the target user account to provide services to the follower account of the target user account, and the group management interface provided by the open platform server includes enhanced functions of an original software system or uses resources of the original software system by means of access of the third party server, the original software system being a social application system provided to ordinary users of the open platform server, the follower account being one of the ordinary users; and
sending the interface call request to the open platform server,
wherein generating the interface call request comprises:
generating the interface call request based on a preset request protocol and a request manner, wherein when the group management operation is one of the group creation operation, the group deletion operation, the group name modification operation, the follower group movement operation, and the remark name setting operation, the request manner is a POST request from the third party server to the open platform server; and when the group management operation is one of the group query operation and the follower group query operation, the request manner is a GET request from the third party server to the open platform server.

2. The method according to claim 1, wherein:
the group management operation comprises the group creation operation, the group creation operation corresponds to a first interface address, and the interface call request carries a group name of a follower group that needs to be created, and the first interface address;
the group management operation comprises the group deletion operation, the group deletion operation corresponds to a second interface address, and the interface call request carries a group identifier of a follower group that needs to be deleted, and the second interface address;
the group management operation comprises the group query operation, the group query operation corresponds to a third interface address, and the interface call request carries the third interface address;
the group management operation comprises the follower group query operation, the follower group query operation corresponds to a fourth interface address, and the interface call request carries an identity of a target follower that needs to be queried, and the fourth interface address;
the group management operation comprises the group name modification operation, the group name modification operation corresponds to a fifth interface address, and the interface call request carries a group identifier of a follower group that needs to be renamed, a name of the renamed group, and the fifth interface address;
the group management operation comprises the follower group movement operation, the follower group movement operation corresponds to a sixth interface address, and the interface call request carries an identity of a target follower that needs to be moved, a group identifier of a target follower group, and the sixth interface address; or
the group management operation comprises the remark name setting operation, the remark name setting operation corresponds to a seventh interface address, and the interface call request carries an identity of a target follower that needs to be set, a remark name, and the seventh interface address.

3. The method according to claim 1, wherein before the generating an interface call request carrying the interface address, the method further comprises:
sending a credential obtaining request to the open platform server, wherein the credential obtaining request carries a unique identifier and a key corresponding to the target user account; and
receiving an interface call credential sent by the open platform server; and
the generating an interface call request carrying the interface address comprises:
generating the interface call request carrying the interface call credential and the interface address.

4. The method according to claim 1, wherein:
the preset request protocol is a Hypertext Transfer Protocol (HTTP), or a Hyper Text Transfer Protocol over Secure Socket Layer (HTTPS); and
the interface address is an HTTP address or an HTTPS address.

5. The method according to claim 1, further comprising:
when the request manner corresponding to the interface call request is the POST request, receiving, by the third party server, return data indicating successful operation from the open platform server; and
when the request manner corresponding to the interface call request is the GET request, receiving, by the third party server, return information requested by the group management operation from the open platform server; and providing, by the third party server, the return information to the client program for being displayed on the visual operation interface.

6. A group management method, comprising:
receiving, by an open platform server, a credential obtaining request sent by a third party server corresponding to a target user account, wherein the credential obtaining request carries a unique identifier and a key corresponding to the target user account;
detecting, by the open platform server, whether the unique identifier and the key are correct;
generating and storing, by the open platform server, a first interface call credential if the unique identifier and the key are correct, the first interface call credential including an access token and an expiration time of the access token;
feeding back, by the open platform server, the first interface call credential to the third party server;
receiving, by the open platform server, an interface call request sent by the target user account, the interface call request carrying an interface address corresponding to a group management operation and a second interface call credential;
reading, by the open platform server, the second interface call credential carried in the interface call request;
verifying, by the open platform server, whether the second interface call credential is valid, including verifying whether the second interface call credential matches with the locally-stored first interface call credential and verifying whether the second interface call credential times out based on the expiration time of the access token; and
calling, by the open platform server in response to verifying that the second interface call credential is valid, a group management interface corresponding to the interface address according to the interface address to perform the group management operation on a follower account following the target user account, wherein the third party server is a background server used by the operator of the target user account to provide services to the follower account of the target user account, and the open platform server provides a group management interface that includes enhanced functions of an original software system or uses resources of the original software system by means of access of the third party server, the original software system being a social application system provided to ordinary users of the open platform server, the follower account being one of the ordinary users.

7. The method according to claim 6, wherein the group management operation comprises at least one of a group creation operation, a group deletion operation, a group query operation, a follower group query operation, a group name modification operation, a follower group movement operation, or a remark name setting operation, and the target user account is a user account applied by an operator in the open platform server.

8. The method according to claim 6, wherein the calling, by the open platform server, a group management interface corresponding to the interface address according to the interface address to perform the group management operation on a follower account following the target user account comprises:
calling, when the interface call request carries a first interface address and a group name of a follower group that needs to be created and the first interface address corresponds to a group creation interface, by the open platform server, the group creation interface corresponding to the first interface address to create the follower group corresponding to the target user account, and setting the corresponding group name;
calling, when the interface call request carries a second interface address and a group identifier of a follower group that needs to be deleted and the second interface address corresponds to a group deletion interface, by the open platform server, the group deletion interface corresponding to the second interface address to delete the follower group corresponding to the group identifier;
calling, when the interface call request carries a third interface address and the third interface address corresponds to a group query interface, by the open platform server, the group query interface corresponding to the third interface address to obtain a group information list corresponding to the target user account, and feeding back the group information list to the target user account;
calling, when the interface call request carries a fourth interface address and an identity of a target follower that needs to be queried and the fourth interface address corresponds to a follower group query interface, by the open platform server, the follower group query interface corresponding to the fourth interface address to obtain a group identifier corresponding to the identity, and feeding back the group identifier to the target user account;
calling, when the interface call request carries a fifth interface address, a group identifier of a follower group that needs to be renamed, and a name of the renamed group and the fifth interface address corresponds to a group name modification interface, by the open platform server, the group name modification interface corresponding to the fifth interface address to modify an original group name of the follower group corresponding to the group identifier into the name of the renamed group;
calling, when the interface call request carries a sixth interface address, an identity of a target follower that needs to be moved, and a group identifier of a target follower group and the sixth interface address corresponds to a follower group movement interface, by the open platform server, the follower group movement interface corresponding to the sixth interface address to move the corresponding target follower from an original follower group into the target follower group according to the identity and the group identifier; and
calling, when the interface call request carries a seventh interface address, an identity of a target follower that needs to be set, and a remark name and the seventh interface address corresponds to a remark name setting interface, by the open platform server, the remark name setting interface corresponding to the seventh interface address to set the remark name of the corresponding target follower according to the identifier and the remark name.

9. A group management apparatus, comprising:
at least a processor and one or more modules stored on a memory and executable by the processor to:
provide a visual operation interface to a client program logged in to a third party server, wherein the visual operation interface provides multiple group management operation options including a group creation operation, a group deletion operation, a group query operation, a follower group query operation, a group name modification operation, a follower group movement operation, and a remark name setting operation;
receive a request of a group management operation based on user input on the visual operation interface on the client program;
obtain an interface address corresponding to the group management operation;
generate an interface call request carrying the interface address, the interface call request being used to call a group management interface provided by an open platform server, the group management interface being used to perform the group management operation on a follower account following a target user account, and the target user account being a user account applied by an operator in the open platform server, wherein the third party server is a background server used by the operator of the target user account to provide services to the follower account of the target user account, and the group management interface provided by the open platform server includes enhanced functions of an original software system or uses resources of the original software system by means of access of the third party server, the original software system being a social application system provided to ordinary users of the open platform server, the follower account being one of the ordinary users; and
send the interface call request to the open platform server.

10. The apparatus according to claim 9, wherein
when the group management operation comprises the group creation operation, the group creation operation corresponds to a first interface address, and the interface call request carries a group name of a follower group that needs to be created, and the first interface address;
when the group management operation comprises the group deletion operation, the group deletion operation corresponds to a second interface address, and the interface call request carries a group identifier of a follower group that needs to be deleted, and the second interface address;
when the group management operation comprises the group query operation, the group query operation corresponds to a third interface address, and the interface call request carries the third interface address;
when the group management operation comprises the follower group query operation, the follower group query operation corresponds to a fourth interface address, and the interface call request carries an identity of a target follower that needs to be queried, and the fourth interface address;
when the group management operation comprises the group name modification operation, the group name modification operation corresponds to a fifth interface address, and the interface call request carries a group identifier of a follower group that needs to be renamed, a name of the renamed group, and the fifth interface address;
when the group management operation comprises the follower group movement operation, the follower group movement operation corresponds to a sixth interface address, and the interface call request carries an identity of a target follower that needs to be moved, a group identifier of a target follower group, and the sixth interface address; and
when the group management operation comprises the remark name setting operation, the remark name setting operation corresponds to a seventh interface address, and the interface call request carries an identity of a target follower that needs to be set, a remark name, and the seventh interface address.

11. The apparatus according to claim 9, wherein the processor is further configured to:
send a credential obtaining request to the open platform server, wherein the credential obtaining request carries a unique identifier and a key that correspond to the target user account;
receive an interface call credential sent by the open platform server; and
generate the interface call request carrying the interface call credential and the interface address.

12. A group management apparatus, applied to an open platform server, comprising:
at least a processor and one or more modules stored on a memory and executable by the processor, the one or more modules comprising:
an obtaining request receiving module, configured to receive a credential obtaining request sent by a third party server corresponding to a target user account, wherein the credential obtaining request carries a unique identifier and a key that correspond to the target user account;
a detection module, configured to detect whether the unique identifier and the key are correct;
a credential generation module, configured to generate and store, when the unique identifier and the key are correct, a first interface call credential, the first interface call credential including an access token and an expiration time of the access token;
a credential sending module, configured to feed back the first interface call credential to the target user account;
a call request receiving module, configured to receive an interface call request sent by the target user account, the interface call request carrying an interface address corresponding to a group management operation and a second interface call credential;
a credential reading module, configured to read the second interface call credential carried in the interface call request; and
a credential verification module, configured to verify whether the second interface call credential is valid, including verifying whether the second interface call credential matches with the locally-stored first interface call credential and verifying whether the second interface call credential times out based on the expiration time of the access token; and
an interface call module, configured to, in response to verifying that the second interface call credential is valid, call a group management interface corresponding to the interface address according to the interface address to perform the group management operation on a follower account following the target user account, wherein the third party server is a background server used by the operator of the target user account to provide services to the follower account of the target user account, and the open platform server provides a group management interface that includes enhanced functions of an original software system or uses resources of the original software system by means of access of the third party server, the original software system being a social application system provided to ordinary users of the open platform server, the follower account being one of the ordinary users.

13. The apparatus according to claim 12, wherein the group management operation comprises at least one of a group creation operation, a group deletion operation, a group query operation, a follower group query operation, a group name modification operation, a follower group movement operation, or a remark name setting operation, and the target user account is a user account applied by an operator in the open platform server.

14. The apparatus according to claim 12, wherein the interface call module comprises:
   a first call unit, configured to call, when the interface call request carries a first interface address and a group name of a follower group that needs to be created and the first interface address corresponds to a group creation interface, the group creation interface corresponding to the first interface address to create the follower group corresponding to the target user account, and setting the corresponding group name;
   a second call unit, configured to call, when the interface call request carries a second interface address and a group identifier of a follower group that needs to be deleted and the second interface address corresponds to a group deletion interface, the group deletion interface corresponding to the second interface address to delete the follower group corresponding to the group identifier;
   a third call unit, configured to call, when the interface call request carries a third interface address and the third interface address corresponds to a group query interface, the group query interface corresponding to the third interface address to obtain a group information list corresponding to the target user account, and feeding back the group information list to the target user account;
   a fourth call unit, configured to call, when the interface call request carries a fourth interface address and an identity of a target follower that needs to be queried and the fourth interface address corresponds to a follower group query interface, the follower group query interface corresponding to the fourth interface address to obtain a group identifier corresponding to the identity, and feeding back the group identifier to the target user account;
   a fifth call unit, configured to call, when the interface call request carries a fifth interface address, a group identifier of a follower group that needs to be renamed, and a name of the renamed group and the fifth interface address corresponds to a group name modification interface, the group name modification interface corresponding to the fifth interface address to modify an original group name of the follower group corresponding to the group identifier into the name of the renamed group;
   a sixth call unit, configured to call, when the interface call request carries a sixth interface address, an identity of a target follower that needs to be moved, and a group identifier of a target follower group and the sixth interface address corresponds to a follower group movement interface, the follower group movement interface corresponding to the sixth interface address to move the corresponding target follower from an original follower group into the target follower group according to the identity and the group identifier; and
   a seventh call unit, configured to call, when the interface call request carries a seventh interface address, an identity of a target follower that needs to be set, and a remark name and the seventh interface address corresponds to a remark name setting interface, the remark name setting interface corresponding to the seventh interface address to set the remark name of the corresponding target follower according to the identifier and the remark name.

15. A group management system, the system comprising:
   a third party server and an open platform server;
   the third party server comprising at least a processor and one or more modules stored on a memory and executable by the processor, the one or more modules comprising:
   an interface address obtaining module, configured to obtain an interface address corresponding to a group management operation;
   a call request generation module, configured to generate an interface call request carrying the interface address, the interface call request being used to call a group management interface provided by an open platform server, the group management interface being used to perform the group management operation on a follower account following a target user account, and the target user account being a user account applied by an operator in the open platform server; and
   a call request sending module, configured to send the interface call request to the open platform server; and
   the open platform server comprising the group management apparatus according to claim 12.

* * * * *